United States Patent
Henrickson et al.

(10) Patent No.: US 9,383,384 B2
(45) Date of Patent: Jul. 5, 2016

(54) EXTENDED-RANGE CLOSED-LOOP ACCELEROMETER

(71) Applicant: Honeywell International Inc., Morristown, NJ (US)

(72) Inventors: Jens Henrickson, St. Paul, MN (US); Donny Rojo, Everett, WA (US)

(73) Assignee: Honeywell International Inc., Morris Plains, NJ (US)

(*) Notice: Subject to any disclaimer, the term of this patent is extended or adjusted under 35 U.S.C. 154(b) by 341 days.

(21) Appl. No.: 13/907,042

(22) Filed: May 31, 2013

(65) Prior Publication Data
US 2014/0352434 A1 Dec. 4, 2014

(51) Int. Cl.
*G01P 15/18* (2013.01)
*G01P 15/125* (2006.01)
*G01P 15/13* (2006.01)
*G01P 15/08* (2006.01)

(52) U.S. Cl.
CPC .............. *G01P 15/125* (2013.01); *G01P 15/131* (2013.01); *G01P 2015/0831* (2013.01)

(58) Field of Classification Search
CPC . G01P 15/125; G01P 15/0802; G01P 15/131; G01P 15/10; G01P 15/18; G01P 15/08; G01C 19/5719; G01C 19/5691
USPC ........... 73/514.32, 514.17, 514.18, 1.37, 1.38
See application file for complete search history.

(56) References Cited

U.S. PATENT DOCUMENTS

| | | | | | |
|---|---|---|---|---|---|
| 5,583,290 | A * | 12/1996 | Lewis | .................... | G01P 15/125 73/514.18 |
| 5,621,157 | A * | 4/1997 | Zhao | ........................ | G01P 21/00 73/1.38 |
| 6,588,117 | B1 * | 7/2003 | Martin | .................... | G01C 21/16 33/320 |
| 6,934,175 | B2 * | 8/2005 | Nishihara | ......... | H01L 27/11502 365/117 |
| 7,146,856 | B2 * | 12/2006 | Malametz | ........... | G01P 15/0802 73/514.23 |
| 7,337,668 | B2 * | 3/2008 | Condemine | ........... | G01P 15/131 73/1.37 |
| 7,610,809 | B2 * | 11/2009 | McNeil | ................. | G01P 15/125 73/514.32 |
| 8,096,182 | B2 * | 1/2012 | Lin | ........................ | G01P 15/125 29/592.1 |
| 8,925,384 | B2 * | 1/2015 | McNeil | ................. | G01P 15/125 73/504.12 |
| 2002/0104378 | A1 * | 8/2002 | Stewart | ...................... | 73/514.21 |
| 2003/0150268 | A1 * | 8/2003 | Takeda et al. | ............... | 73/514.18 |
| 2003/0167843 | A1 * | 9/2003 | Hollocher et al. | ......... | 73/514.17 |
| 2003/0209073 | A1 * | 11/2003 | Carroll et al. | ............... | 73/504.09 |
| 2005/0145030 | A1 * | 7/2005 | Elliott et al. | ............... | 73/514.18 |

(Continued)

FOREIGN PATENT DOCUMENTS

EP 1983320 A1 10/2008
EP 2159579 A1 3/2010

OTHER PUBLICATIONS

Response to Extended European Search Report dated Sep. 30, 2014, from counterpart European Patent Application No. 14167605.6, dated Dec. 31, 2014, 10 pp.

(Continued)

*Primary Examiner* — Helen Kwok
(74) *Attorney, Agent, or Firm* — Shumaker & Sieffert, P.A.

(57) ABSTRACT

A microelectromechanical systems (MEMS) accelerometer with extended operational capabilities beyond a closed-loop saturation. The present invention combines the closed-loop feedback signal and the measured proof-mass position into a hybrid acceleration measurement, which effectively provides an operating range equal to the traditional closed-loop operating range plus the sensor's mechanical open-loop range.

12 Claims, 2 Drawing Sheets

(56) References Cited

U.S. PATENT DOCUMENTS

| | | | |
|---|---|---|---|
| 2006/0150735 A1* | 7/2006 | Fax et al. | 73/514.18 |
| 2008/0000296 A1* | 1/2008 | Johnson | 73/514.18 |
| 2008/0295597 A1* | 12/2008 | Stewart et al. | 73/514.18 |
| 2009/0095078 A1* | 4/2009 | Rozelle | 73/504.13 |
| 2009/0107238 A1* | 4/2009 | Guo | 73/514.32 |
| 2009/0282916 A1* | 11/2009 | Modugno | G01C 19/5776 73/504.12 |
| 2010/0024552 A1 | 2/2010 | Foster | |
| 2012/0056630 A1 | 3/2012 | Itou et al. | |
| 2014/0165691 A1* | 6/2014 | Stewart | 73/1.38 |

OTHER PUBLICATIONS

Search Report from counterpart European Patent Application No. 141676605.6, dated Sep. 30, 2014, 7 pp.

* cited by examiner

US 9,383,384 B2

EXTENDED-RANGE CLOSED-LOOP ACCELEROMETER

BACKGROUND OF THE INVENTION

A microelectromechanical systems (MEMS) accelerometer closed-loop system measures the position of the sensor's proof-mass and uses a force-feedback system to rebalance the proof-mass to a null position. The amount of force required to drive the proof-mass to the null position is proportional to input acceleration; therefore, the feedback signal is used as the acceleration measurement. Once the input acceleration exceeds the feedback system's maximum response, the closed-loop operating range is exceeded and the proof-mass begins to move away from the null position. For a traditional closed-loop system, the acceleration measurement becomes saturated and there is no additional acceleration information available. Thus, at saturation the closed-loop system becomes inaccurate.

SUMMARY OF THE INVENTION

The present invention provides an extended operating range for a MEMS accelerometer operating in a closed-loop mode. The present invention combines the closed-loop feedback signal and the measured proof-mass position into a hybrid acceleration measurement, which effectively provides an operating range equal to the traditional closed-loop operating range plus the sensor's mechanical open-loop range.

The present invention provides an approach that is a straightforward and inexpensive way of providing additional g-range capability without modifying the basic closed-loop sensor or electronics architecture. The amount of force required to drive the proof-mass to the null position is proportional to input acceleration; therefore, the feedback signal is used as the acceleration measurement. Once the input acceleration exceeds the feedback system's maximum response, the closed-loop operating range is exceeded and the proof-mass begins to move away from the null position. The system detects this movement, assigns the movement an acceleration value, and then adds it to the maximum range of the closed-loop sensor.

BRIEF DESCRIPTION OF THE DRAWINGS

Preferred and alternative embodiments of the present invention are described in detail below with reference to the following drawings:

FIGS. 2-1 and 2-2 are schematic diagrams of an accelerometer circuit formed in accordance with a second embodiment of the present invention.

DETAILED DESCRIPTION OF THE INVENTION

The present invention combines the closed-loop feedback signal and the measured proof-mass position into a hybrid acceleration measurement, which effectively provides an operating range equal to the traditional closed-loop operating range plus the sensor's mechanical open-loop range.

Once the input acceleration exceeds the feedback system's maximum response, the closed-loop operating range is exceeded and the proof-mass begins to move away from the null position. The sensor itself is not saturated, however, as the open-loop g-range of the sensor is still available until the sensor itself becomes mechanically saturated.

Figure 1:
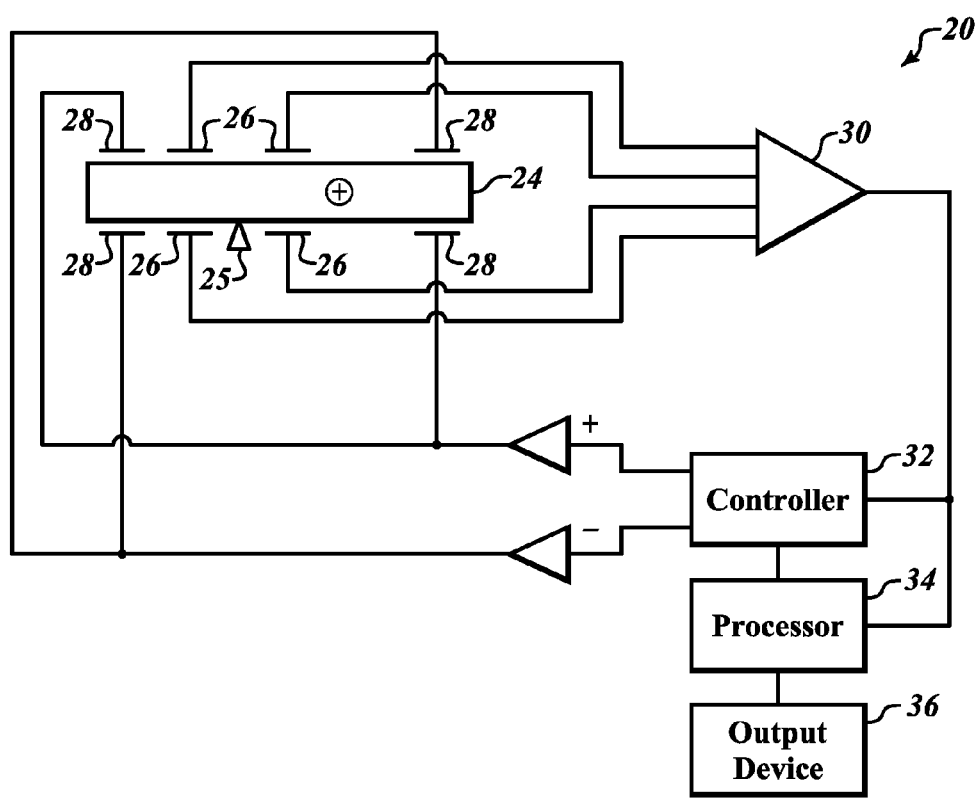
FIG. 1 is a schematic diagram of an accelerometer circuit formed in accordance with a first embodiment of the present invention.

FIG. 1 illustrates an exemplary microelectromechanical systems (MEMS) accelerometer system 20 that provides sensed acceleration values from closed-loop operation components and/or open-loop operation components until mechanical saturation is attained. The system 20 includes a seesaw-type proof-mass 24 that has a center of mass not collocated with a pivot mount 25 about which the proof-mass 24 pivots.

Four sensor pads 26 are located of either side of the proof-mass 24 nearest the pivot mount 25. Four drive pads 28 are also located on each side and each end of the proof-mass 24. The sensor pads 26 are coupled to an analog-to-digital (A/D) converter 30. The digital output (i.e., sensor signal) of the A/D converter 30 is sent to a closed-loop controller 32 and a processor 34. The closed-loop controller 32 generates a feedback signal based on the sensor signal received from the A/D converter 30.

The processor 34 determines if closed-loop operation of the closed-loop components (i.e., the proof-mass 24, the drive pads 28) have reached the predetermined closed-loop saturation limit. If the limit has not been reached, the processor 34 sends only the closed-loop feedback signal (i.e., the closed-loop acceleration value) received from the controller 32 to an output device 36. If the limit has been reached, the processor 34 combines the closed-loop feedback signal with the output of the A/D converter 30, which provides a sense of position of the proof-mass 24 (i.e., an open-loop acceleration value). The sensed proof mass position is proportional to the amount of input acceleration beyond the closed-loop saturation range. This process occurs until mechanical saturation (i.e., the proof-mass hits mechanical stops) occurs.

Figures 1, 2:
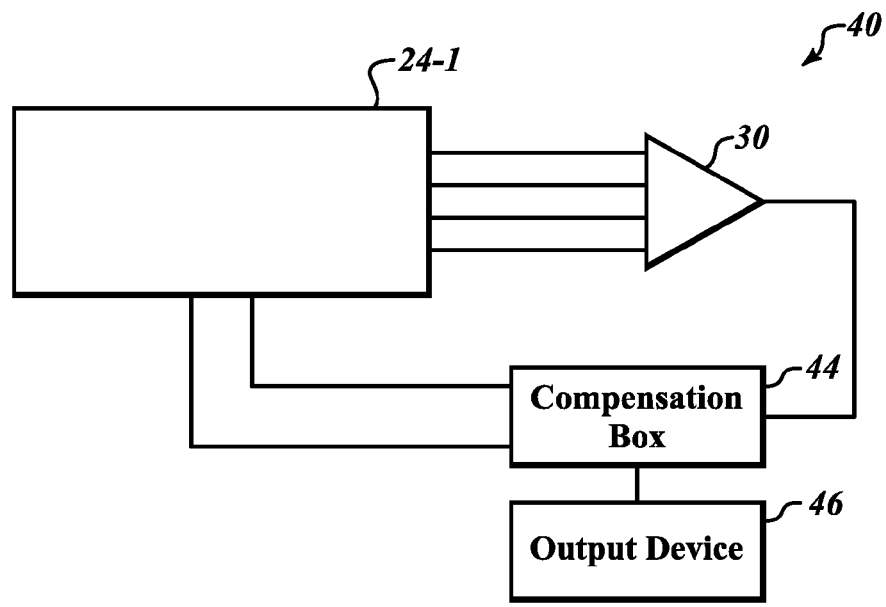
Figure 2:
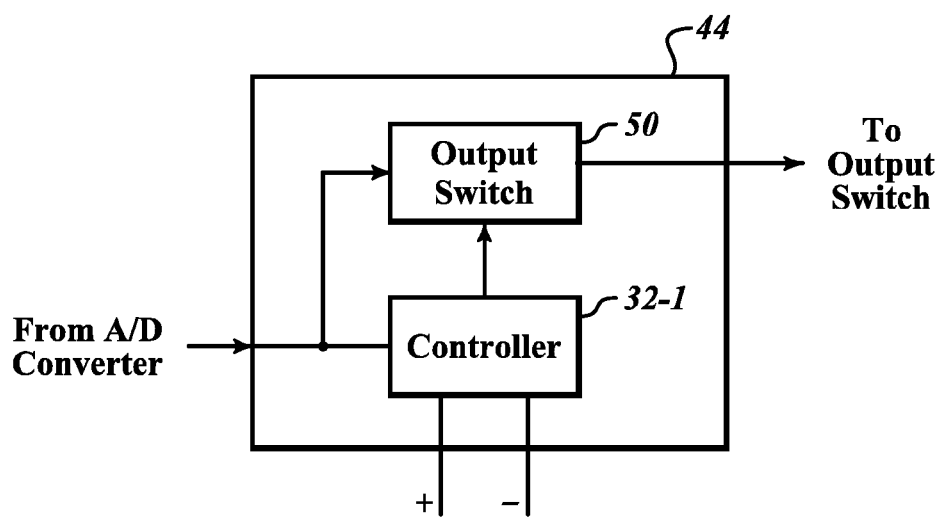

FIGS. 2-1 and 2-2 illustrate an alternate MEMS accelerometer system 40. The system 40 includes a proof-mass with sensing and drive pads 24-1, the A/D converter 30, a compensation box 44, and an output device 46. The compensation box 44 includes an output switch 50 and a controller 32-1. The controller 32-1 operates similarly to the controller 32 (FIG. 1). The output switch 50 receives the signals from the A/D converter 30 and acts as a multiplexer if closed-loop operation is detected according to a saturation signal received from the controller 32-1. Saturation is determined when the acceleration value hits the max of the closed-loop system or when the proof-mass moves away from the null position.

if no saturation signal is received, then the switch 50 just passes the output (i.e., the feedback signal +/−) of the controller 32-1 to the output device 46. If a saturation signal is received, the switch 50 combines the controller output with the signal (i.e., open-loop acceleration signal) received at the output switch 50 from the A/D converter 30.

In one embodiment, a function is added to a digital Application-Specific Integrated Circuit (ASIC) to provide the sum of the feedback signal and the proof-mass position signal as the acceleration measurement. The feedback signal and the proof-mass position signal may be multiplied by normalizing constants prior to summing to convert each signal to common units of acceleration. The normalizing constants used may be calculated based on the sensor and electronics design characteristics, or may be empirically determined for each individual sensor. In one embodiment, a field-programmable gate array (FPGA) is programmed to provide the above-described function.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. An accelerometer device comprising:
   a seesaw-mounted proof-mass;
   a plurality of capacitive sensors configured to sense a position of the seesaw-mounted proof-mass and generate a feedback signal based on the position;
   a plurality of driver devices configured to apply a force to the seesaw-mounted proof-mass based on the feedback signal;
   a controller configured to
      receive proof-mass position information from one or more of the capacitive sensors;
      generate the feedback signal based on the received proof-mass position information in order to keep the seesaw-mounted proof-mass at a null position;
      send the feedback signal to at least one of the driver devices;
      determine whether closed-loop saturation has occurred based on the feedback signal;
      in response to determining closed-loop saturation has, occurred:
         convert the proof-mass position information and the feedback signal to a common unit of acceleration by multiplying the proof-mass position information by a first normalizing constant to determine a normalized proof-mass position signal and multiplying the feedback signal by a second normalizing constant to determine a normalized feedback signal; and
         determine a hybrid acceleration value based on the sum of the normalized proof-mass position information and the normalized feedback signal; and
         output the determined hybrid acceleration value; and
      in response to determining closed-loop saturation has not occurred:
         determine a closed-loop acceleration value based on the feedback signal; and
         output the determined closed-loop acceleration value.

2. An accelerometer device comprising:
   a seesaw-mounted proof-mass;
   a plurality of capacitive sensors configured to sense a position of the seesaw-mounted proof-mass and generate a feedback signal based on the position;
   a plurality of driver devices configured to apply a force to the proof-mass based on the received feedback signal;
   a controller configured to:
      receive proof-mass position information from one or more of the capacitive sensors;
      generate the feedback signal based on the received proof-mass position information;
      send the feedback signal to at least one of the driver devices; and
      determine whether closed-loop saturation has occurred based on the feedback signal;
   an output switch configured to
      determine a combined acceleration value by at least combining an open-loop acceleration value and a maximum closed-loop acceleration value, if the closed-loop saturation has been determined to occur by the controller;
      determine a closed-loop acceleration value based on the feedback signal, if the closed-loop saturation has not been determined to occur by the controller; and
      output one of the combined acceleration value or the closed-loop acceleration value.

3. The accelerometer system of claim 1, wherein the seesaw-mounted proof-mass has a center of mass not co-located with a pivot mount about which the proof-mass pivots.

4. A method comprising:
   determining whether closed-loop saturation has occurred based on a feedback signal generated by a controller based on proof mass position information received from a plurality of capacitive sensors configured to sense a position of a seesaw-mounted proof-mass of an accelerometer system;
   in response to determining closed-loop saturation has occurred:
      converting the proof-mass position information and the feedback signal to a common unit of acceleration by multiplying the proof-mass position information by a first normalizing constant to determine a normalized proof-mass position signal and multiplying the feedback signal by a second normalizing constant to determine a normalized feedback signal;
      determining a hybrid acceleration value by summing the normalized proof-mass position signal and the normalized feedback signal; and
      outputting the determined hybrid acceleration value;
   in response to determining closed-loop saturation has not occurred:
      determining the acceleration value as a closed-loop acceleration value based on the feedback signal; and
      outputting the closed-loop acceleration value.

5. The method of claim 4 further comprising:
   determining the first normalizing constant and the second normalizing constant based on one or more of capacitive sensor design characteristics, accelerometer device electronics design characteristics, or capacitive sensor empirical characteristics.

6. The method of claim 4, wherein the method is performed by an accelerometer device comprising a digital application specific integrated circuit (ASIC).

7. The method of claim 4, wherein the method is performed by an accelerometer device comprising a field-programmable gate array (FPGA).

8. The accelerometer device of claim 1, wherein the controller comprises a digital application specific integrated circuit (ASIC) configured to convert the proof-mass position information and the feedback signal to the common unit of acceleration by multiplying the proof-mass position information by the first normalizing constant to determine the normalized proof-mass position signal and multiplying the feedback signal by the second normalizing constant to determine the normalized feedback signal.

9. The accelerometer device of claim 1, wherein the controller comprises a field-programmable gate array (FPGA) configured to convert the proof-mass position information and the feedback signal to the common unit of acceleration by multiplying the proof-mass position information by the first normalizing constant to determine the normalized proof-mass position signal and multiplying the feedback signal by the second normalizing constant to determine the normalized feedback signal.

10. The accelerometer device of claim 1, wherein the controller is further configured to determine the first normalizing constant and the second normalizing constant based on one or more of:
   design characteristics of the capacitive sensors;
   design characteristics of electronics of the accelerometer device; or
   empirical characteristics of the capacitive sensors.

11. The accelerometer device of claim 2, further comprising a compensation box configured to:
- convert the open-loop acceleration value and the maximum closed-loop acceleration value to a common unit of acceleration by multiplying the open-loop acceleration value by a first normalizing constant to determine a normalized open-loop acceleration value and multiplying the maximum closed-loop acceleration value by a second normalizing constant to determine a normalized maximum closed-loop acceleration value; and
- sum the normalized open-loop acceleration value and the normalized maximum closed-loop acceleration value to determine the combined acceleration value.

12. The accelerometer device of claim 11 wherein the compensation box is further configured to determine the first normalizing constant and the second normalizing constant based on one or more of:
- design characteristics of the capacitive sensors;
- design characteristics of electronics of the accelerometer device; or
- empirical characteristics of the capacitive sensors.

\* \* \* \* \*